United States Patent [19]

Barnea

[11] Patent Number: 4,595,072
[45] Date of Patent: Jun. 17, 1986

[54] VEHICLE SUSPENSION SYSTEM

[76] Inventor: Daniel Barnea, 930 Commonwealth Ave., Boston, Mass. 02215

[21] Appl. No.: 546,176

[22] Filed: Oct. 27, 1983

[51] Int. Cl.⁴ ............................................. B62D 55/14
[52] U.S. Cl. .................... 180/169; 280/6 R; 280/707
[58] Field of Search ............ 280/707, 6 H, 6 R, 6.1, 280/6.11; 180/167, 169

[56] References Cited

U.S. PATENT DOCUMENTS

| | | | |
|---|---|---|---|
| 3,035,853 | 5/1962 | Klein | 280/124 |
| 3,124,368 | 3/1964 | Corley et al. | 280/6 |
| 3,174,587 | 3/1965 | Walton | 188/87 |
| 3,625,303 | 12/1971 | Cameron | 180/169 |
| 3,653,613 | 4/1972 | Palmer et al. | 280/103 R |
| 3,881,736 | 5/1975 | Wilfert | 280/6.1 |
| 4,033,423 | 7/1977 | Frosseav | 280/707 |
| 4,162,083 | 7/1979 | Zabler et al. | 280/707 |
| 4,401,310 | 8/1983 | Ishikawa et al. | 280/707 |
| 4,402,375 | 9/1983 | Glaze | 180/169 |

Primary Examiner—Richard A. Bertsch
Attorney, Agent, or Firm—Sandler & Greenblum

[57] ABSTRACT

A vehicle comprises a chassis member, a ground engaging member mounted on the chassis member for supporting the same as the vehicle traverses a road surface, a load supporting member such as a seat mounted on the chassis mount, and an resilient component interposed between two of the members. An anticipating device monitors the condition of the road surface in advance of the point at which the ground engaging member engages the road surface; and the resilient component has an adjustment which is responsive to the anticipating device for dynamically controlling the spring constant of the resilient member as the ground engaging member engages the mounted point for the purpose of providing a controlled ride within the vehicle.

11 Claims, 4 Drawing Figures

VEHICLE SUSPENSION SYSTEM

TECHNICAL FIELD

This invention relates to a suspension system for a vehicle having a chassis member to which a ground engaging member is mounted, such vehicle being termed hereinafter a vehicle of the type described.

BACKGROUND ART

Resilient connections are universally employed in vehicles of the type described to minimize vibration and shock loads on the goods or persons carried by such vehicles. Thus, springs or other flexible supports such as shock absorbers are conventionally interposed between the chassis and the wheels of a vehicle, and between the chassis and payload supporting means mounted on the chassis. The spring constant of each of these resilient connections is selected by the designer to optimize the ride for a person or payload carried by the vehicle.

In their simplest form, these resilient connections have functional spring constants, which is the term used hereinafter to describe the operation of a resilient member in which the force exerted thereby is proportional to its deflection, and are not affected by outside agencies. Judicious selection of resilient members and their configuration permits designers to achieve what many considered to be optimally smooth rides for passengers in automobiles, for example, under given constraints of wheel-base size, total mass, types of wheels and tires, etc.

More sophisticated resilient connections used on vehicles of the type described permit the spring constants to be modified dynamically in ways that enhance their riding characteristics of the vehicle. U.S. Pat. Nos. 3,124,368 and 3,881,736 are examples of the last mentioned resilient connections wherein the suspension system is modified electrically. While providing ride smoothing results, the current reduction in total mass of the vehicle for fuel economy purposes has resulted in vehicles whose riding quality is diminished as compared to larger, heavier and less fuel efficient vehicles. It is therefore an object of the present invention to provide a new and improved vehicle suspension system which does not suffer from the deficiencies of the prior art as described above.

DISCLOSURE OF INVENTION

In accordance with the present invention, the effect on a vehicle of variations in the elevation of terrain traversed by a vehicle is anticipated to allow sufficient time for such effect to be cancelled out. Anticipation is achieved by sensing the elevation of the terrain to be encountered by the ground engaging member of the vehicle relative to the terrain currently beneath the ground engaging member. By knowing the future elevation of the terrain before it is encountered by the ground engaging member, the necessary modifications to the suspension system of the vehicle, or to a payload carried by the vehicle (e.g., a seat) can be effected in time to alter or to adjust the suspension system of the vehicle and/or the suspension system of its payload in order to smooth the ride of vehicle and/or its payload.

In one embodiment of the invention, a suspension system for a vehicle having a chassis member to which a ground engaging member is mounted includes spring means interposed between the members for controlling the rate of deflection therebetween in response to the traverse of terrain by the vehicle. In the context of the present invention, the term "spring means" is used to designate a device that has both a spring component and a damping component; and the term "spring constant", as applied to such spring means, is intended to comprehend both spring and damping parameters of the spring means. Thus the term "spring system parameters" of the suspension system includes both its spring and damping parameters.

According to the present invention, apparatus is provided for anticipatorily adjusting the effect of the spring system parameters of the spring means in accordance with variations in the elevation of the terrain to be traversed by the vehicle. Specifically, the invention includes a sensor for producing an output that is a measure of the elevation of the chassis above the terrain at a location in advance of the point at which the ground engaging means engages the ground. In this manner, the suspension system anticipates variations in the road surface in advance of their effect on the vehicle. This permits the spring system parameters of the suspension system to be adjusted so that when the ground engaging member reaches the sensed location on the ground, the spring system parameters of the suspension system will already have been adjusted to properly respond to the change in elevation of the road surface in a way that minimizes fluctuations of the chassis, or of the payload.

The invention can be applied between the ground engaging member and the chassis or between the chassis and a load supporting member mounted on the chassis.

In order to control the spring system parameters of the suspension system, active or passive actuators can be utilized. Active actuators may be very fast and effective to achieve a high quality smooth ride. However, the forces involved in such actuators are likely to be high with the result that expensive elements with high energy consumption may be required. Actuators of this type are likely to be useful for small payloads where a high quality smooth ride is essential.

Passive actuators, although more limiting and potentially slower, will consume virtually no energy and thus become practical for large and heavy frame stabilization, or for a subframe with an important payload.

In the preferred form of the invention, the anticipating means includes a sensor for producing an output related to the elevation of the chassis above the road surface at a location in advance of the point at which the ground engaging member engages the road surface. Practically speaking, the sensor is physically located in advance of the ground engaging member; and preferably, in a motor vehicle, the sensor will be located on the bumper of the vehicle in advance of a front wheel.

The preferred form of the spring means is a hydraulic cylinder which is attached to the chassis, for example, the cylinder having a pair of fluid filled chambers separated by a piston which is attached to the ground engaging member. A bypass conduit interconnects the chambers as in a conventional hydraulic shock absorber; but in this instance, a selectively adjustable valve in the bypass conduit is provided for controlling the flow of fluid between the chambers. The valve is adjustable in accordance with the output of the sensor to thus provide a smooth ride as the vehicle traverses an uneven road surface.

BRIEF DESCRIPTION OF THE DRAWINGS

Embodiments of the present invention are shown in the accompanying drawings wherein.

DETAILED DESCRIPTION

Figure 1:
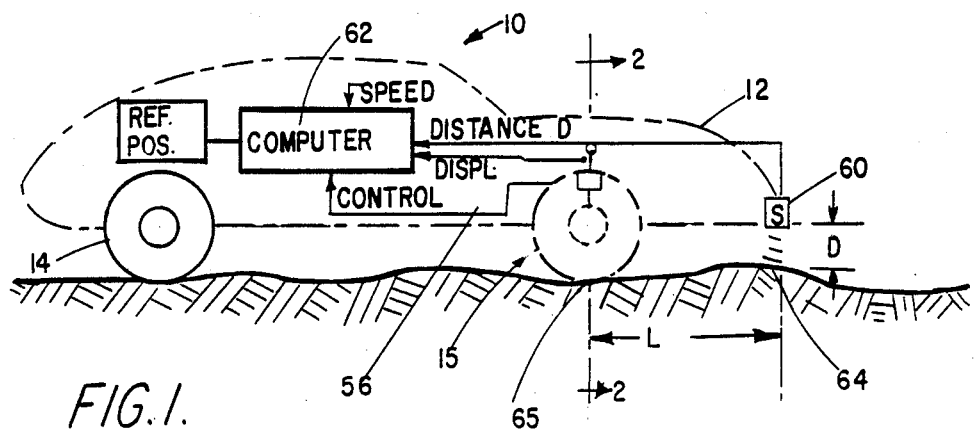
FIG. 1 is a schematic showing of a vehicle into which the present invention is incorporated.
Figure 2:
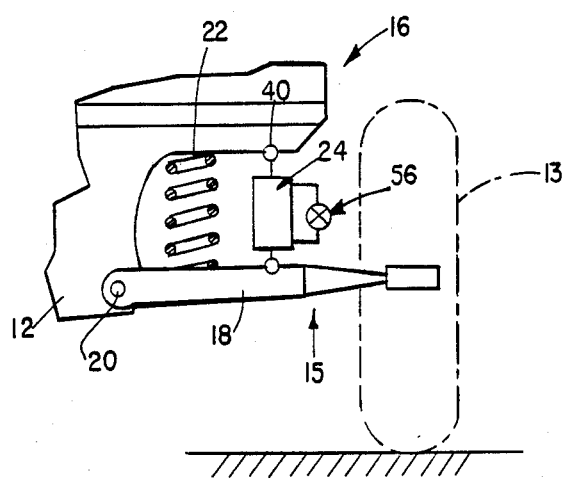
FIG. 2 is a sectional view taken along the line 2 of FIG. 1.
Figure 3:
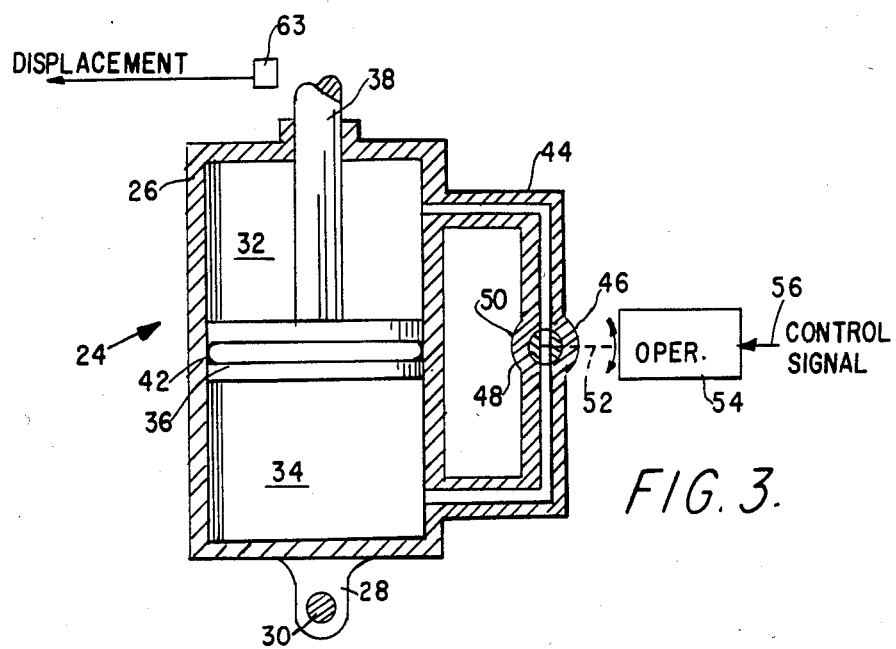
FIG. 3 is a sectional view of the preferred form of the invention.

Referring now to FIG. 1, reference numeral 10, designates a motor vehicle into which the present invention is incorporated. Vehicle 10 comprises chassis 12, and a plurality of ground engaging means 14 in the form of wheels carrying pneumatic tires 13 (FIG. 2). Wheels 14 are mounted to chassis 12 by means of suspension system 16 (FIG. 2) which constitutes the present invention. Suspension system 16 includes arm 18 pivotably mounted at 20 to chassis 12, and spring 22 interposed between chassis member 12 and arm 18 of ground engaging means 15. The suspension means also includes hydraulic shock absorber 24 details of which are shown in FIG. 3 to which reference is now made.

Shcok absorber 24 incldes an hydraulic cylinder 26 having mounting boss 28 for connection by pin 30 to arm 18 of the ground engaging means 15. The cylinder of the shock absorber has a pair of fluid filled chambers 32 and 34 separated by piston 36 which is axially displaceable within the cylinder. The free end of piston rod 38 attached to piston 36 passes through an axial end of the cylinder and is connected by pin 40 to chassis 12. Suitable seals 42 around the periphery of the piston isolate chambers 32 and 34 which are filled with hydraulic fluid.

Bypass conduit 44 interconnects chambers 32 and 34 to limit the rate at which fluid is transferred between the cylinders in response to deflection of the ground engaging means with respect to the chassis. To exert control over the rate at which fluid can be transferred between chambers 32 and 34 in the hydraulic zone, selectively adjustable valve 46 in conduit 44 is provided. Valve 46 comprises, in its simplest form, a rotatable rod 48 containing metering aperture 50. The angular position of the rod with respect to the conduit determines the flow resistance between chambers 32 and 34.

Rod 48 is mechanically coupled at 52 to an operator 54 which is electrically controlled by a second control signal applied at input 56. That is to say, the control signal applied to operator 54 determines the angular position of rod 48 and thus the amount of resistance in the bypass conduit interconnecting chambers 32 and 34. Effectively, the control signal will determine the spring constant of the suspension system.

The road surface in advance of the point at which the ground engaging member engages the road surface is monitored by sensor 60. As shown in FIG. 1, sensor 60 is mounted under the bumper of vehicle 10 about 1 meter from point 65 at which ground engaging means 15 engages the road surface. Thus, sensor 60 determines the position of chassis 12 above the road surface about 1 meter ahead of the ground engaging means. This distance is indicated by D in FIG. 1 and the distance of the sensor in front of the ground engaging means 15 is designated by L.

Sensor 60 can have many forms, but the preferred form is an ultarsonic transducer that produces periodic bursts of ultrasonic energy directed downwardly from the chassis toward the road surface. By timing the receipt of an echo of each pulse transmitted by the sensor, the distance of the sensor above the road surface can be determined by computer 62 in a conventional manner. Computer 62 thus determines the distance D and generates a control signal which is applied via line 56 to operator 54. In calculating the control signal necessary for future control of the spring constant when the ground engaging means moves from point 65 to point 64, computer 62 takes into account the output of the sensor (distance of the chassis to the point 64), the actual position of piston 38 in cylinder 26 (output of sensor 63), and the speed of the vehicle as obtained in a conventional manner. Thus, the control signal takes into account the position of piston 38 in the hydraulic cylinder (as measured by pickup 63) which is a measure of the distance of the chassis above the actual point of contact 62 between the ground engaging means and the road surface and a distance D of the sensor 60 above the future point 64 of the ground engaging means.

The resultant control signal angularly positions rod 48 of valve 46 to establish a flow resistance in bypass conduit 44 such that the effective spring constant of the suspension system will optimize the riding quality of the vehicle. By anticipating the road condition in advance of the vehicle, the suspension system of the vehicle can be modified in a way that will permit the designer to build into the vehicle the type of riding quality that he wishes the vehicle to have substantially independently of the mass of the vehicle, its wheel base, etc. Thus, a relatively small and relatively light vehicle can provide passengers with a ride comparable to a larger and heavier vehicle.

Figure 4:
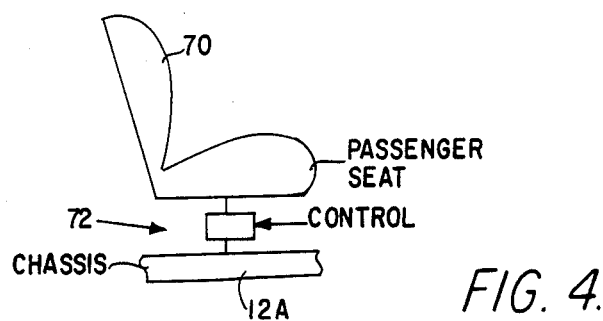
FIG. 4 is a side view of an alternate embodiment of the invention.

Instead of adjusting the spring constant between the ground engaging means and the chassis shown in FIGS. 1-3, the invention is also applicable to modifying the suspension of a load carrying means, e.g., a passenger seat, in the vehicle; and this is illustrated in FIG. 4 to which reference is now made.

Instead of rigidly fastening passenger seat 70 to chassis 12a, which is the usual mode of mounting, suspension system 72 can be interposed between the seat and the chassis. Suspension system 72 is similar to system 24 shown in FIG. 3. In this instance, the mass to be controlled is considerably smaller than the mass controlled in FIG. 1; and this arrangement permits smaller, lighter and faster acting suspension systems to be utilized. Again, because computer 62 takes into account vehicle speed, the distance of the road surface above the chassis in advance of the ground engaging means, as well as the displacement of the piston in the hydraulic cylinder, the designer can build into the passenger seat practically any type of riding qualities that he wishes.

Various modifications of the components will be suggested to those skilled in the art. For example, systems other than hydraulic cylinders can be utilized for the suspension. In addition, sensors other than ultrasonic sensors could be used. Use of the anticipatory information made available by the sensor located ahead of the ground engaging means of the vehicle can be by ways other than illustrated above. For example, stabilization of a vehicle and/or its payload can be achieved using active, as well as passive components which are described above. Thus, a payload carried by a vehicle can be stabilized by repositioning the payload relative to the vehicle as the latter responds to variations in terrain being traversed by the vehicle. Such repositioning can be by way of an active element, such as a lever or piston, controlled by the terrain sensor output, all to the end that the payload remains stabilized and its position relative to a datum substantially fixed and independent of the terrain traversed by the vehicle carrying the payload.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A vehicle comprising:
   (a) a chassis member;
   (b) a ground engaging member mounted on said chassis member for supporting the same as the vehicle traverses a road surface;
   (c) a load supporting member such as a seat;
   (d) mounting means for mounting the load supporting member on the chassis member;
   (e) operable means interposed between two of the members for controlling the point in time, the magnitude, and the rate of deflection therebetween; and
   (f) anticipating means for monitoring the condition of the road surface in advance of the point at which the ground engaging member engages the road surface;
   (g) said operable means being responsive to said anticipating means for stabilizing said load supporting member.

2. A vehicle according to claim 1 wherein the spring means is interposed between the chassis member and the ground engaging member.

3. A vehicle according to claim 1 wherein the spring means is interposed between the chassis member and the load supporting member.

4. A vehicle according to claim 1 wherein said operable means comprises spring means having a parameter adjustable by said anticipating means.

5. A vehicle according to claim 4 wherein a parameter that is adjusted is the effective spring constant of the spring means.

6. A vehicle according to claim 5 wherein said anticipating means includes a sensor for producing an output related to the elevation of the chassis above the road surface and a location in advance of the point by which the ground engaging member engages the road surface.

7. A vehicle according to claim 6 wherein the sensor is physically located in advance of the ground engaging member.

8. A vehicle according to claim 6 including a computer responsive to the output of said sensor for producing a control signal that anticipates fluctuations in the road surface before the ground engaging member encounters such fluctuations.

9. A vehicle according to claim 6 wherein said spring means has adjustable means for establishing the spring constant of said spring means in response to the output of said sensor.

10. A vehicle according to claim 9 wherein the spring means includes an hydraulic cylinder for attachment to one of the members, the cylinder having a pair of fluid filled chambers separated by a piston for attachment to the other of the members, a bypass conduit interconnecting the chambers, a selectively adjustable valve for controlling the flow of fluid between the chambers, and means for adjusting said valve in accordance with the output of said sensor.

11. A vehicle according to claims 9 wherein the spring means includes an hydraulic cylinder for attachment to one of either the chassis member of the load supporting member the cylinder having a pair of fluid filled chambers separated by a piston for attachment to the other of either the chassis or load supporting member, a bypass conduit interconnecting the chambers, a selectively adjustable valve for controlling the flow of fluid between the chambers, and means for adjusting said valve in accordance with the output of said sensor.

* * * * *